United States Patent [19]

Larner

[11] Patent Number: 5,239,632
[45] Date of Patent: Aug. 24, 1993

[54] DEVICE TO TRANSLATE LOGICAL UNIT NUMBER COMMUNICATIONS ON ONE SCSI BUS TO ID COMMUNICATIONS ON A SUBORDINATE SCSI BUS

[75] Inventor: Joel B. Larner, Fort Collins, Colo.

[73] Assignee: Hewlett-Packard Company, Palo Alto, Calif.

[21] Appl. No.: 869,975

[22] Filed: Apr. 16, 1992

[51] Int. Cl.⁵ .............................................. G06F 1/00
[52] U.S. Cl. .................... 395/325; 395/275;
 364/DIG. 1; 364/DIG. 2; 364/228.5;
 364/238.2; 364/238.3; 364/926.93
[58] Field of Search ........................ 395/275, 425, 325;
 364/DIG. 1, DIG. 2

[56] References Cited

U.S. PATENT DOCUMENTS

| | | | |
|---|---|---|---|
| 4,914,574 | 4/1990 | Terada | 395/275 |
| 5,067,071 | 11/1991 | Schanin | 395/275 |
| 5,097,439 | 3/1992 | Patriquin | 395/425 |

Primary Examiner—Allen R. MacDonald
Assistant Examiner—Clifford Knoll

[57] ABSTRACT

A system and method that allows for up to fifty-six devices to be connected to a SCSI bus where there does not have to be any modification of the devices in terms of the SCSI interface. The Logical Unit Number of the SCSI ID number provided on a master SCSI bus is used as the subordinate bus SCSI ID number on a subordinate SCSI bus. Remapping of the data from the master SCSI bus to the subordinate SCSI bus is accomplished using this Logical Unit Number. In this way, direct communications appears to be occurring between a target device connected to the subordinate SCSI bus and an initiator device connected to the master SCSI bus. The Selection and Reselection cycles of the SCSI protocol are accommodate without any modification.

15 Claims, 8 Drawing Sheets

DEVICE TO TRANSLATE LOGICAL UNIT NUMBER COMMUNICATIONS ON ONE SCSI BUS TO ID COMMUNICATIONS ON A SUBORDINATE SCSI BUS

BACKGROUND OF THE INVENTION

1. Field of the Invention

The present invention relates generally to SCSI buses, and more particularly, to devices and methods for effectively connecting additional devices to a SCSI bus, which exceed the maximum number of eight as specified by the identification (ID) number.

2. Related Art

The small computer systems interface (SCSI) is an ANSI standard communications bus that includes the electrical and logical protocol specification. SCSI provides for the connection of up to eight devices on the bus, each having a unique identification (ID) from zero to seven. The eight devices can be of any type, ranging from host computers to disk drives, tape drives, optical storage devices, printers, scanners, etc.

ANSI document number X3.131-1986 (Global Engineering Documents, Irvine, Calif.) describes the electrical and logical protocol specifications for the SCSI. This document is incorporated by reference herein.

SCSI has become an industry standard. It is used, for example, in the computer workstation environment. It is also used in the personal computer environment. It has become the standard for peripherals, such as disk drives, tape drives, optical storage devices, printers, scanners, etc.

Like all standards, SCSI is used in a large number of installed pieces of computer equipment. Users have invested considerable money in computers and peripherals which employ the SCSI.

With the constant increase in the performance/price ratio of computer system, the amount of data and the number of peripherals that need to be accommodated by the SCSI has increased. The problem with this increase is that the SCSI can only accommodate eight devices. There are many applications where more than eight devices are needed or desired.

FIG. 1 shows a block diagram of a conventional SCSI system. Referring now to FIG. 1, a host computer (each called an initiator) 102 has been arbitrarily assigned SCSI ID No. 7. The host computer 102 is electrically connected to an SCSI bus 104. Connected to SCSI bus 104 are seven additional devices (called targets) 106, 108, 110, 112, 114, 116, and 118. These additional (target) devices 106-118 can be any device that complies with the SCSI standard protocol. Additional device 106 has been assigned, for example, SCSI ID No. 0. Similarly, drive 108 has been assigned SCSI ID No. 1, drive 110 has been assigned SCSI ID No. 2, robotics 112 has been assigned SCSI ID No. 3, drive 114 has been assigned SCSI ID No. 4, drive 116 has been assigned SCSI ID No. 5, and robotics 118 has been assigned SCSI ID No. 6.

As an inside, it should be noted tat drive 108, drive 110, and robotics 112 are shown as residing in an optical library enclosure 120. This is merely for purposes of illustration to show that more than one device connected to a SCSI bus can reside in a single physical enclosure. This inclusion of more than one SCSI device in a single physical (mechanical) enclosure is a trend, for example, in connection with the storage of large amounts of data.

Another conventional concept is also illustrated in FIG. 1. The length of the SCSI bus is limited in order to achieve desired electrical performance. For example, the SCSI bus cannot be more than six meters long when a Single Ended approach is used. When Differential communications are used, the SCSI bus can have a maximum length of twenty-five meters.

There are many situations where the additional device is located more than six meters, or more than twenty-five meters, (depending on the communications scheme employed) from the host computer 102. This is graphically illustrated in FIG. 1. It is seen that a conventional repeater 124 connects additional device 106 via a SCSI bus 2 (assigned reference number 126) to the (main) SCSI bus 104. As is well known, repeater 124 provides the necessary signal amplification to allow for the additional device 106 to be physically situated more than the six meter or twenty-five meter limit from the host computer 102.

As is well known, the repeater 124 merely acts to boost the signal level of the signal received on one SCSI bus, which boosted signal is provided to a second SCSI bus and vice versa. In effect, it acts like a conventional repeater in terms of merely amplifying the signal levels from one bus to a second bus. It should be noted that no signal storage or mapping or other function occurs in repeater 124.

As stated above, there are many situations where it is needed or desired to have more than eight devices connected to a SCSI bus.

One conventional approach for allowing for more than eight units to be effectively connected to the SCSI bus is shown n FIG. 2. The SCSI bus 104 is connected to a peripheral device 202. Peripheral device 202 is assigned a single SCSI ID number. As far as the SCSI bus 104 is concerned, peripheral device 202 has a single SCSI identification.

Peripheral device 202 includes a plurality of N drives, for example, (where N is a positive integer greater than 1). Specifically, in the examples shown, peripheral device 202 includes a drive 1 (labeled with reference number 218), a drive 2 (labeled with a reference number 224), and a drive N (labeled by reference number 230). A controller 204 electrically connects the SCSI bus 104 with the drives 218, 224 and 230 using a hard-wired, (often proprietary), and dedicated approach as follows.

As shown, controller 204 includes a microprocessor 206, switching electronics 208, a stored computer program 210, and electronic storage 212 for use by the controller 204 and microprocessor 206. Together, controller 204 routes information received from the SCSI bus 104 to the specific drive 218, 224, 230 as determined by the program stored in controller 204 in program 210. This routing is accomplished using individual buses and control lines for each of the drives. For example, as shown, drive 218 is connected to the controller 204 via a bus 214. In addition, a control line 216 is included, which allows controller 204 to control the operation of drive 218. Similarly, drive 224 includes a bus 220 and a control line 222, and drive 230 includes a bus 226 and a control line 228. It can be seen that this approach requires specific buses and control lines for the controller 204 in order to effect the desired data transfer.

Controller 204 must be programmed using its stored computer program 210 so as to be able to carry out the intended functions that are needed to accommodate the SCSI bus 104. It can be appreciated that the drives 218, 224 and 230 cannot be directly connected to the SCSI bus 104. Similarly, it can be appreciated that the controller 204 is required in order to accommodate the interfacing between the SCSI bus 104 and the drives 218, 224 and 230. Typically, controller 204 is required to reformat data received from SCSI bus 104 for transmission to one or more of the drives 218, 224 and 230, and for reformating data received from a drive 218, 224, and 230 for transmission on the SCSI bus 104. Therefore, it can also be appreciated that considerable data reformatting and SCSI bus protocol accommodation must be made by the peripheral device 202. Nevertheless, peripheral device 202 provides additional storage capacity than can be accomplished using a single drive attached directly to SCSI bus 104.

The SCSI standard further includes a logical unit number (LUN). A logical unit number is specified from 0 to 7. Some host computers 102 include drivers (hardware and/or software) which provide the logical unit number, whereas others have more simple drivers that do not provide the logical unit number. Modification of the host computer to include such a driver is relatively simple and inexpensive and is conventionally known.

The provision of a logical unit number by the host computer 102 on the SCSI bus 104 allows for a peripheral device 202 to specify up to eight devices contained in the peripheral device 202. In other words, the logical unit number allows the peripheral device 202 to select a desired internal device that is being specified by the SCSI bus 104. Thus, up to eight devices can be contained in a peripheral device 202 having a controller 204 which can recognize and operate using a logical unit number provided on the SCSI bus 104.

Conventional approaches required that the controller 204 recognize the logical unit number, then act to control the internal devices 218, 224 through 230, and to remap data sent to and received from devices 218, 224 through 230 via the controller 204. This requires typically that the devices 218, 224 and 230 be dedicated. It also requires considerable additional electronics to accommodate the logical unit function specified on the SCSI bus 104. Nevertheless, it can be seen that this results in a single SCSI ID number being able to accommodate up to eight internal devices as specified by the logical unit number.

Conventional approaches exhibit significant deficiencies. Where the logical unit number is not used, it can be seen that the number of devices that can be accommodated on the SCSI bus 104 is a maximum of eight.

Where the logical unit number is employed, it can be seen that the maximum number of logical unit numbers of devices that can be accommodated on the SCSI bus 104 is fifty-six (7 SCSI ID numbers×8 logical units, where the first SCSI ID number is assigned to the host computer 102). However, considerable electronics is required to accommodate the additional devices that are assigned to a specific SCSI ID number. In additional, these devices typically have to be dedicated, and do not use the SCSI bus interface between their controller 204 and the device 218, 224 through 230. Reformatting and control signaling is required, and existing devices merely have SCSI interfaces cannot be connected to the controller 204 or used in such a configuration.

The present invention solves these problems in the manner set forth below.

SUMMARY OF THE INVENTION

The present invention relates to a system and method for allowing more than eight units on a master SCSI bus. The system is adapted to accommodate an initiator device and a target device, the initiator device having a SCSI port and a master SCSI bus adapted to be connected thereto, the target device having a SCSI port and a subordinate SCSI bus adapted to the connected thereto.

The present invention involves setting a master SCSI ID number for a minnow device. The minnow device is capable of performing a select cycle to permit communication between the initiator device connected to the master SCSI bus and the target device connected to the subordinate SCSI bus. The minnow device is further capable of performing a reselect cycle to permit communication between the target device and the initiator device.

During a select cycle, an initiator device selects the minnow using SCSI ID number set on a master SCSI bus, and the minnow responds and retrieves a logical unit number from an identify message out, according to standard SCSI protocol. The minnow then converts the logic unit number to the ID of the specified target device on a subordinate SCSI bus, the target device responds and an identify message out is sent to the target device on the subordinate SCSI bus. The minnow then connects the master SCSI bus to the subordinate SCSI bus so that the initiator device can communicate with the target device.

During a reselect cycle, the target device reselects the minnow using the SCSI ID number sent on the subordinate SCSI bus. The minnow converts the subordinate bus SCSI ID number to the logical unit number of the master SCSI bus, reselects the initiator device on the master SCSI bus, and handshakes the identify message in to the initiator. The minnow then connects the master SCSI bus to the subordinate SCSI bus so that the target device can communicate with the initiator device.

BRIEF DESCRIPTION OF THE DRAWINGS

The present invention as defined by the claims is better understood with reference to the written description read in conjunction with the following drawings.

DETAILED DESCRIPTION OF THE PREFERRED EMBODIMENTS

The present invention allows for up to fifty-six devices to be connected to the SCSI bus 104, where each device can employ the SCSI interface and does not have to be modified in any way. The host computer 102 can access any (target) device using the SCSI ID number and logical unit number assigned to that device, and the device can access the host computer 102 in a similar fashion in accordance with the standard SCSI protocol. No dedicated wiring or bus structure is required, as is the case with conventional technology. As far as any device or the host computer 102 is concerned, communications between the two appears to take directly in accordance with the SCSI protocol.

Figure 1:
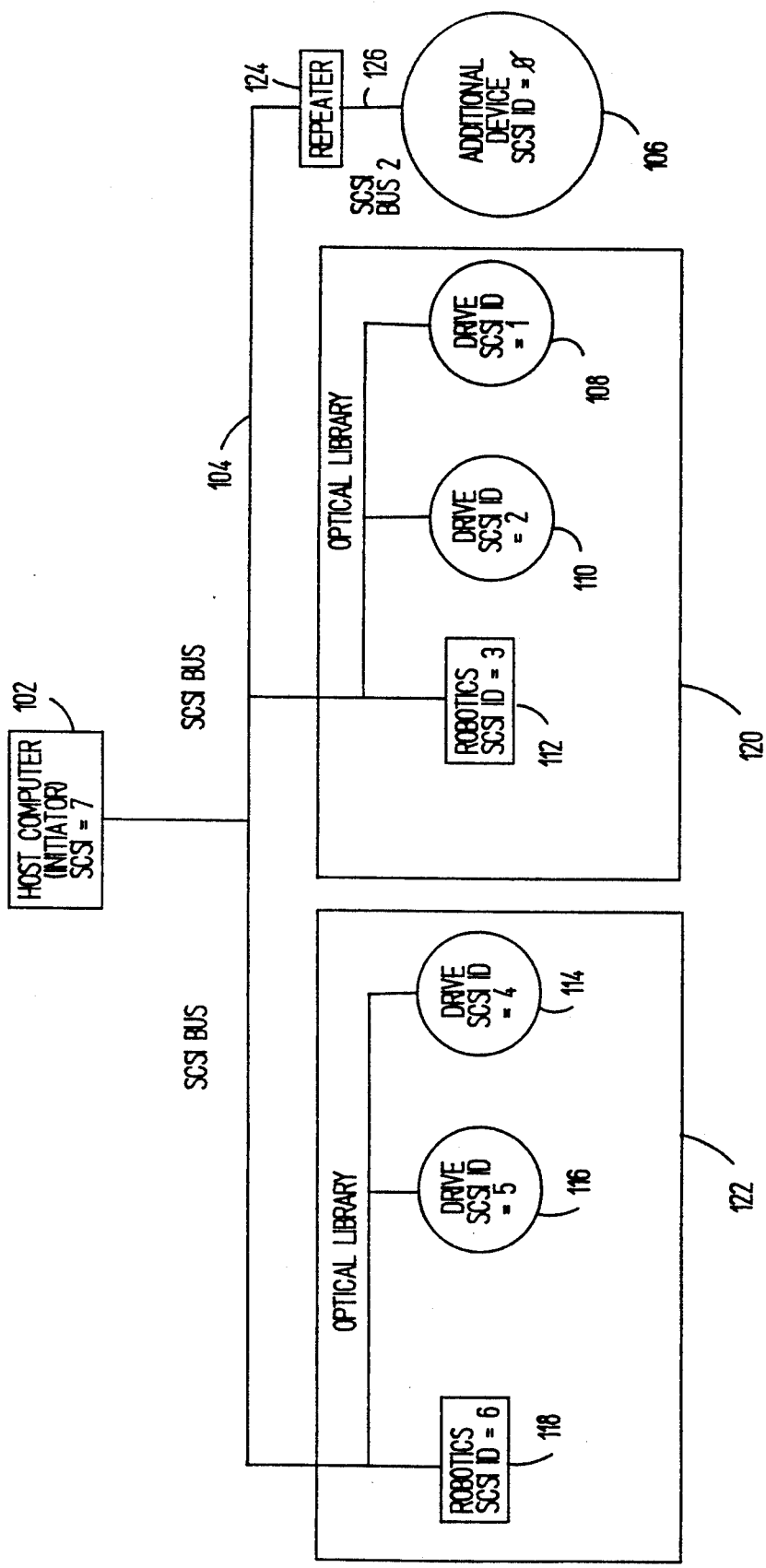
FIG. 1 is a block diagram of a conventional system having seven devices connected to a host computer on a SCSI bus, and including a repeater with one of the additional devices for allowing an increased distance between the additional device and the host computer.
Figure 2:
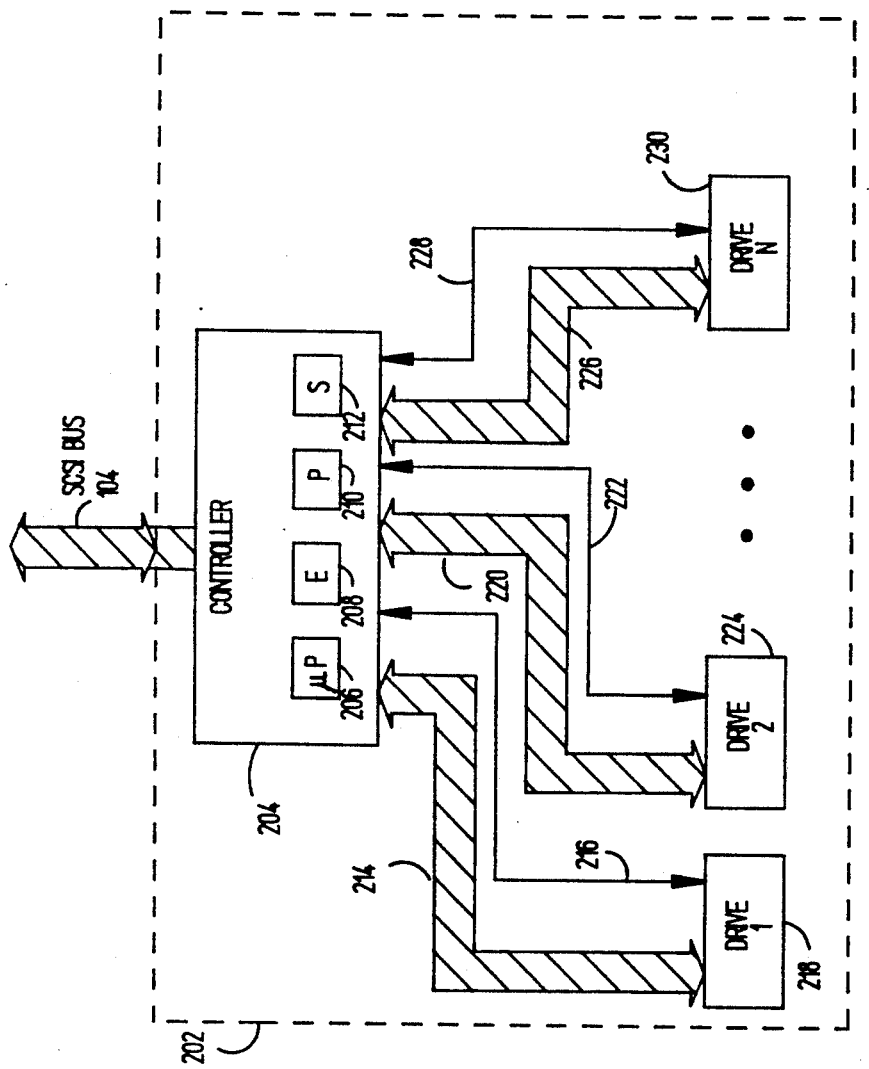
FIG. 2 shows a conventional peripheral device 202 architecture having several internal devices connected tot he SCSI bus via a controller.
Figure 3:
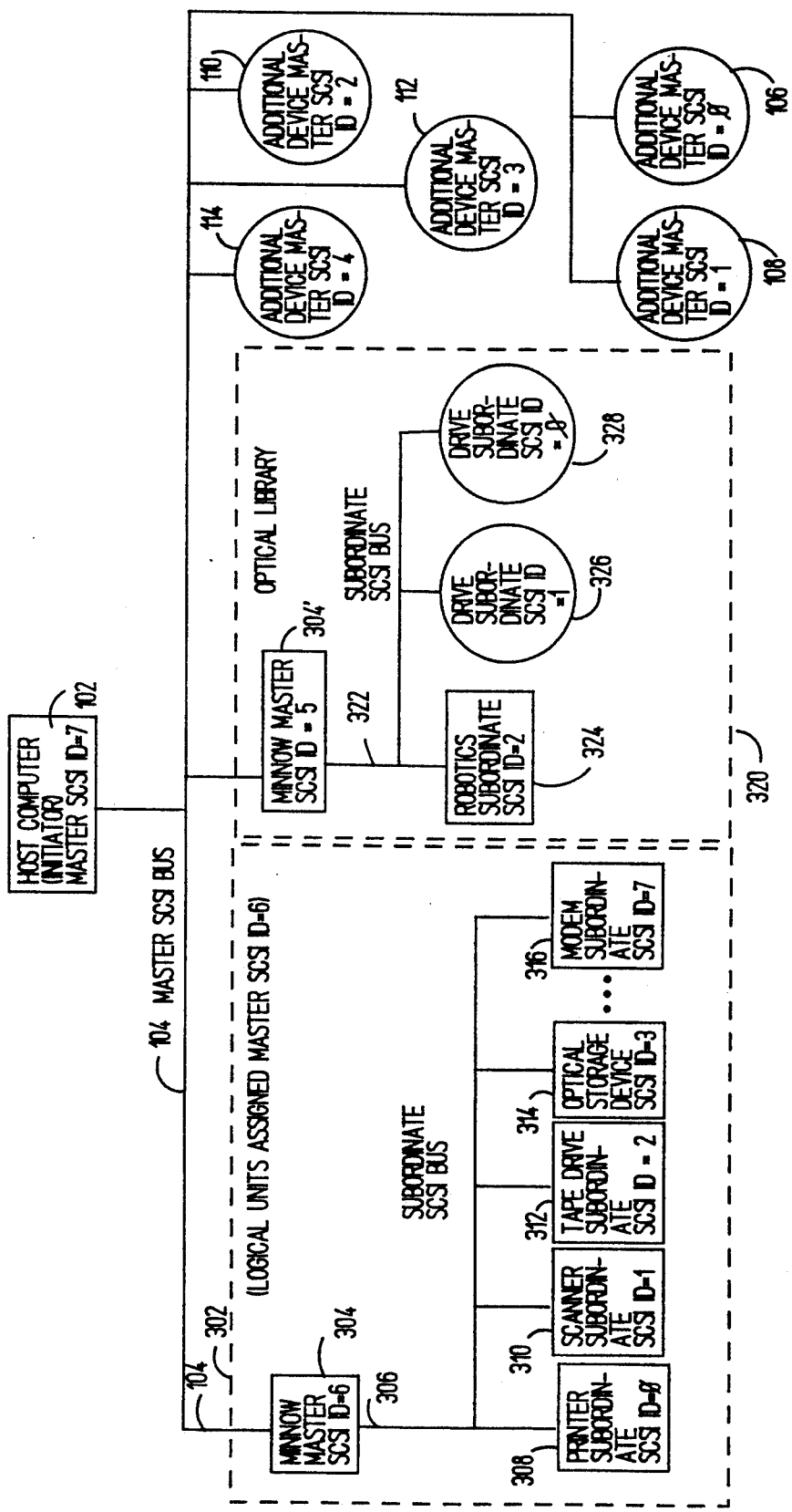
FIG. 3 is a block diagram at a high level of the architecture of the present invention.

Referring now to FIG. 3, a block diagram shows the high-level architecture of the present invention. Similar numbers found in FIG. 3 and other drawings correspond to the same numbers found in each.

Host computer (initiator) 102 provides SCSI ID numbers and logic logical unit numbers in accordance with the SCSI protocol. Host computer 102 is assigned SCSI ID number 7. It should be noted that the host computer 102 must include a driver which can provide the logic unit numbers (LUN). Such drivers are conventional and are readily available.

Host computer 102 can be any computer system using a SCSI bus. For example, it can be a workstation made by Hewlett Packard of Palo Alto, Calif., Sun Microsystems of Mountain View, Calif. or the like. It can also be a personal computer.

Host computer 102 is connected to the SCSI bus 104. As shown in FIG. 3, it is labeled the "master" SCSI bus 104. The use of the term master is merely for purposes of ease in explanation. As far as host computer 102 is concerned, master SCSI bus 104 is its SCSI bus. Connected to master SCSI bus 104 are additional devices 106, 108, 110, 112 and 114. These additional devices are assigned master SCSI ID numbers 0, 1, 2, 3 and 4, respectively.

Master SCSI ID number 6 is connected to the master SCSI bus 104 by a device called a Minnow 304. Minnow 304 is assigned master SCSI ID number 6. The term Minnow for device 304 is used merely as a short identifier for purposes of ease of discussion and explanation, and in no way limits the present invention. Minnow 304 is associated with the eight additional device that are associated with master SCSI ID number 6. This association is indicated by the dashed-line box 302. It should be noted that the additional devices associated with master SCSI ID number 6 do not have to be physically located in the same mechanical enclosure, or at the same location, but merely need to be physically distant from Minnow 304 within the length (6 meters or 25 meters) of the communications approach in accordance with the SCSI protocol that is used, assuming no repeaters are associated with master SCSI ID number 6.

The eight additional devices that are associated with master SCSI ID number 6 are connected to the Minnow 304 by a "subordinate" SCSI bus 306. The term subordinate is used merely for purposes of explanation. It should be noted that the protocol used on SCSI bus 306 is the standard SCSI protocol. Thus, it can be appreciated, that the additional devices connected to the subordinate SCSI bus 306 can be ones that use the conventional SCSI protocol, and do not have to be modified or enhanced in any way to be used in the present invention.

Representative examples of additional devices that can be connected to the subordinate SCSI bus 306 are shown in FIG. 3. For example, a printer 308 which is assigned subordinate SCSI ID number 0 for the subordinate SCSI bus 306 can be used. Similarly, a scanner 310, which, for example, is assigned the subordinate SCSI ID number 1 for the subordinate SCSI bus 306 can be used. A tape drive 312, which, for example, is assigned the subordinate SCSI ID number 2 for the subordinate SCSI bus 306 can be used. An optical storage device, which, for example, is assigned the subordinate SCSI ID number 3 for the subordinate SCSI bus 306 can be used. A modem (modulator/demodulator), which, for example, is assigned the subordinate SCSI ID number 7 for the subordinate SCSI bus 306 can be used. These are merely representative examples of the eight additional devices that can be connected to the subordinate SCSI bus 306 in accordance with the present invention. It should be understood that any additional device which utilizes the standard SCSI interface can be connected to the subordinate SCSI bus 306. No modification or enhancement of the additional device is required.

A specific example of application of the present invention is shown with respect to a physical enclosure 320 housing an optical library for storing very large amounts of data, which can be provided to the host computer 102 by the master SCSI bus 104. A Minnow 304' is included in the physical enclosure 320. It should be noted that the Minnow 304' is the same as Minnow 340, except for the fact that it responds to master SCSI ID number 5. This ability to specify the master SCSI ID number in the Minnow is discussed below in detail. It should be understood that the Minnow 304 or 304' can be set by the user so as to respond to any master SCSI ID number from 0 through 7.

A subordinate SCSI bus 322 is connected to Minnow 304'. Connected to subordinate SCSI bus 322 are two magneto optical (MO) rewritable drives 326 and 328. Drive 326 is, for example, assigned subordinate SCSI ID number 1 for the subordinate SCSI bus 322. Moreover, drive 328, for example, is assigned subordinate SCSI ID number 0 for the subordinate SCSI bus 322. A robotic mechanism 324 is also connected to the subordinate SCSI bus 322. Robotic 324 is assigned subordinate SCSI ID number 2 for the subordinate SCSI bus 322. Robotics mechanism 324 is used to transport magneto optical media to the MO drives 326 and 328. It should be understood that additional MO drives could be provided on the subordinate SCSI bus 322.

Minnow 304 and Minnow 304' each map communications provided on the master SCSI bus 104 for their particular master SCSI ID number to the appropriate device on the associated subordinate SCSI bus 306 or 322, respectively.

Specifically, the host computer 102 provides a master SCSI ID number and a logical unit number as part of its standard SCSI protocol. The Minnow 304 responds to its master SCSI ID number 6. It maps communications to the devices connected to its subordinate SCSI bus 306 in accordance with the logical unit numbers that are supplied by the host computer 102. Only one master SCSI ID number is used for the master SCSI bus 104. However, through the use of the logical unit members associated with that master SCSI ID number, the Minnow 304 is able to connect up to eight additional devices to the host computer 102 through the use of its mapping function and its subordinate SCSI bus 306. Each of the additional devices connected to its subordinate SCSI bus 306 does not have to be modified since the mapping of the logical unit numbers from the master SCSI bus 104 are converted to subordinate SCSI ID numbers for the subordinate SCSI bus 306 in the manner discussed below. Thus, the Minnow 304 bridges the master SCSI bus 104 with its subordinate SCSI bus 306. This is described below in greater detail.

Figure 5:
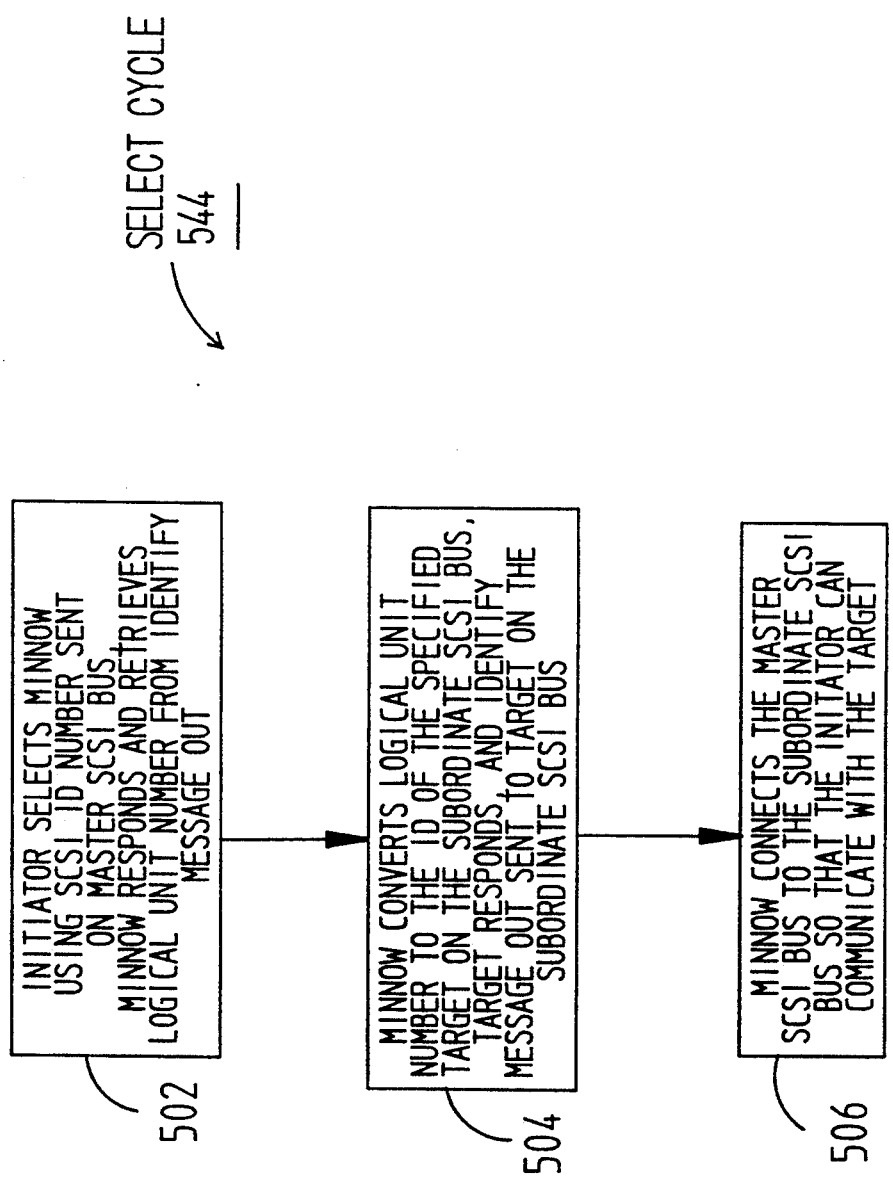
FIG. 5 is a high level flowchart of the steps of the Select cycle of the present invention.
Figure 6:
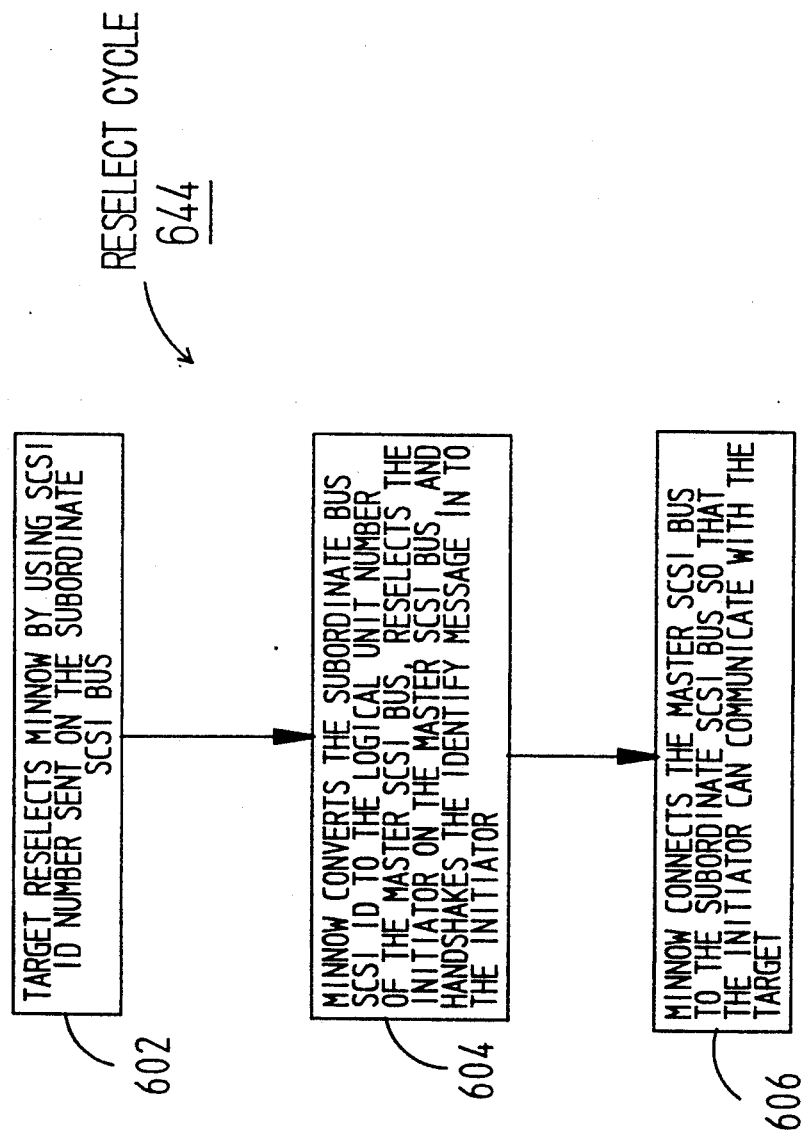
FIG. 6 is a high level flowchart of the steps of the Reselect cycle of the present invention.

The method of the present invention is described at a high level in connection with FIGS. 5 and 6. FIG. 5 shows at a high level the steps associated with the Select cycle 544. FIG. 6 shows at a high level the steps associated with the Reselect cycle 644.

As used herein, the Select cycle 544 and the Reselect cycle 644 are in accordance with those cycles as used in the SCSI protocol. There has been no modification in any way to the SCSI protocol with regard to the Select cycle or the Reselect cycle, or with respect to anything else in accordance with the architecture and method of the present invention.

Referring now to FIG. 5, in the Select cycle 544 a first step 502 is that the initiator (also called the host computer 102) selects the Minnow 304 by sending its master SCSI ID number out on the master SCSI bus 104. The Minnow responds to its master bus SCSI ID number and retrieves the logical unit number from the "Identify Message Out" that is then sent by the initiator 102. According to the known SCSI protocol this step 502 acts to establish communication in the Select cycle 544 between the initiator 102 and the Minnow 304. As far as the initiator 102 is concerned, the Minnow that is selected using the master SCSI ID number is the target device.

The Minnow in a step 504 converts the logical unit number from the Identify Message Out to the subordinate SCSI ID number of the specified target on the subordinate SCSI bus 306. Then the Minnow 304 communicates with the target using the subordinate SCSI ID number of the target. The target device responds. And the Minnow 304 then sends to the target the Identify Message Out via the subordinate SCSI bus 306. In essence, step 504 constitutes the establishment of communications between the Minnow 304 and the target device as specified by the logical unit number received from the initiator 102.

In a final or third step 506 of the Select cycle 554, the Minnow 304 connects the master SCSI bus 104 to the subordinate SCSI bus 306 so that the initiator 102 can communicate with the target device on the subordinate SCSI bus 306. This communication from the initiator 102 to the target device on subordinate SCSI bus 306 and vice versa appears to each side to be direct. In fact, as discussed below, transceivers are utilized in the Minnow 304 so that transfer of the data between the master SCSI bus 104 and the subordinate SCSI bus 306 can be accomplished by the Minnow 304.

As is well known, the SCSI protocol includes a Reselect cycle 644. The purpose for this is to allow a target device to work on a task and to not tie up the SCSI bus while it is working on this task. In other words, the target device one assigned a task in the select cycle, can get off the master and subordinate SCSI buses and start working on the specified task. When the target device has gotten to the point in the specified task that it is ready to send data back out on the master and subordinate SCSI buses, it initiates the Reselect cycle 644. In this way, optimal utilization of the SCSI master and subordinate buses occurs.

Referring now to FIG. 6, in the Reselect cycle 644 a first step 602 is that the target Reselects the Minnow by sending its SCSI ID out on the subordinate SCSI bus 306. The Minnow responds to its master bus SCSI ID number and retrieves the logical unit number from the Identify Message In that is sent by the target. This step 602 acts to establish communications in the Reselect cycle between the target device and the Minnow 304. As far as the target device is concerned, the Minnow that is reelected is the initiator.

The Minnow in a step 604 converts the subordinate bus SCSI ID number to the logical unit number of the master SCSI bus. Then the Minnow 304 reselects the initiator 102 on the master SCSI bus 104. The Minnow 304 then handshakes the Identify Message In to the initiator 102 on the master SCSI bus 104. In essence, step 604 constitutes the reestablishment of communications between the Minnow 304 and the initiator 102.

In a final or third step 606 of the Reselect cycle 644, the Minnow 304 connects the master SCSI bus 104 to the subordinate SCSI bus 306 so that the initiator 102 can communicate with the target device on the subordinate SCSI bus 306. This communications from the initiator 102 to the target device on the subordinate SCSI bus 306 and vice versa appears to each side to be direct. In fact, as discussed below, transceivers are utilized in the Minnow 304 so that transfer of the data between the master SCSI bus 104 and the subordinate SCSI bus 306 can be accomplished by the Minnow 304.

Now that the Selection and Reelection cycles of the present invention have been described, a representative architecture for the Minnow 304 is discussed in connection with FIG. 4.

Figure 4:
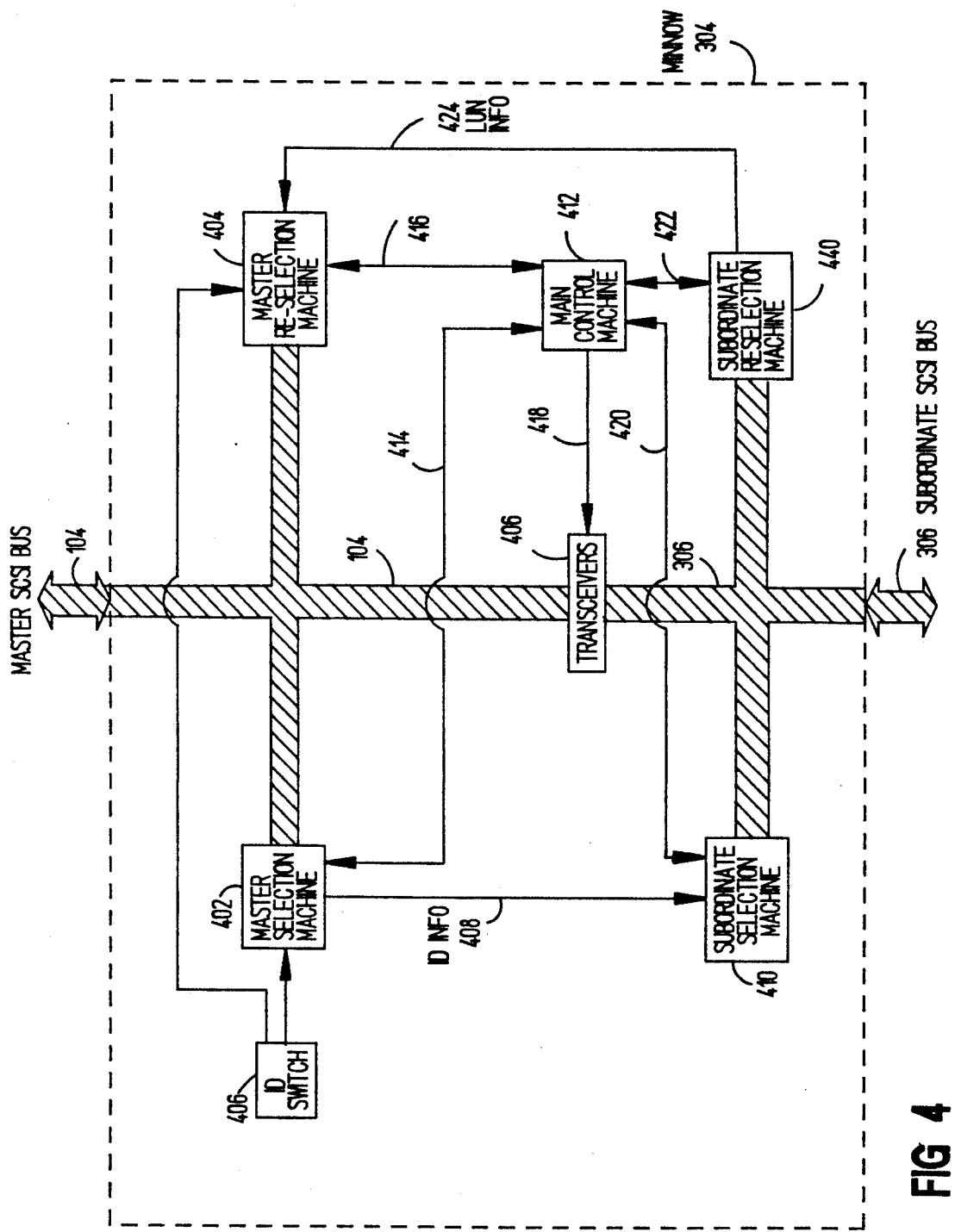
FIG. 4 is a block diagram of the architecture of the Minnow 304.

Referring now to FIG. 4, the master SCSI bus 104 is connected to a master selection machine 402, a master reselection machine 404, and transceivers 406. Master selection machine 402 is connected to an ID switch 406, as is the master reselection machine 404. The ID switch 406, which typically is a DIP or toggle switch of conventional design can be set by the user to specify the master SCSI ID number for the master SCSI bus 104 that the Minnow 304 is set to respond to.

Master selection machine 402 responds to the master SCSI ID number sent on the master SCSI bus 104, and then retrieves the logical unit number from the Identify Message Out received from the master SCSI bus 104. The master selection machine 402 converts the logical unit number to the subordinate SCSI ID number of the specified target on the subordinate SCSI bus 306. This subordinate SCSI ID number (also called ID info) is supplied via a line 408 to a subordinate selection machine 410.

The subordinate selection machine 410 is connected to the subordinate SCSI bus 306. Similarly, a subordinate reselection machine 440 is connected to the subordinate SCSI bus 306. In addition, the transceivers 406 are connected to the subordinate SCSI bus 306.

A main control machine 412 communicates master selection machine control signals 414 to/from the master selection machine 402, communicates master reselection machine control signals 416 to/from the master reselection machine 414, communicates transceiver control signals 418 to/from the transceivers 406, communicates subordinate selection machine control signals 420 to/from the subordinate selection machine 410, and communicates subordinate reselection machine control signals 422 to/from the subordinate reselection machine 440. The main control machine 412 acts to control the operation of the five devices (state machines 402, 404, 410, 440 and transceivers 406) that it is connected to in the Minnow 304. Control is in accordance with the Selection and Reselection cycles as discussed above in connection with FIGS. 5 and 6, and as discussed below in connection with FIGS. 7 and 8. Specific circuit implementations for the five devices are not necessary for one of ordinary skill in the art to carry out the present invention, and should become evident to those working in the SCSI art.

The subordinate selection machine 410 communicates with the target via the subordinate SCSI bus 306. The target is identified by the ID info received on line 408. It is the subordinate selection machine 410 under control of the main control machine 412 that sends the Identify Message Out to the target on the subordinate SCSI bus 306.

Thereafter, the main control machine 412 communicates with the transceivers 406 so that proper transfer of the data on master SCSI bus 104 and the data on subordinate SCSI bus 306 takes place so that the initiator and the target believe that they are in direct communications with each other.

In the Reselection cycle 644, the subordinate reselection machine 440 responds to the Reselection and Identify Message In received from the target on the subordinate SCSI bus 306. The subordinate reselection machine 440 responds and retrieves the subordinate bus SCSI ID from the Identify Message In.

The subordinate reselection machine 440 converts the subordinate bus SCSI ID number to the logical unit number, which is also called the LUN Info. The logical unit number (LUN INFO) is provided via a line 424 to the master reselection machine 404.

The master reselection machine 404 reselects the initiator on the master SCSI bus 104. Under control of the main control machine 412, it reselects the initiator then handshakes the Identify Message In to the initiator connected to the master SCSI bus 104.

Thereafter, the main control machine 412 via transceiver control signals 418 uses the transceivers 406 to properly transfer the data on the subordinate SCSI bus 306 to the master SCSI bus 104 and vice versa. In this way, the target and the initiator believe that they are in direct communications with each other. The Minnow 304 can be fabricated using any conventional or future developed approach. It is contemplated that the Minnow 304, with the exception of the ID switch 406, can readily be implemented in a single chip form utilizing conventional technology. Such a single chip approach is attractive due to the small size, low cost, and low power consumption that would be achieved.

A more detailed version of the Selection cycle 644 is now discussed with reference to FIG. 7. In a Power Up step 702, the Minnow 304 is provided with power in accordance with conventional approaches. Thereafter, in a step 704, the main control machine 412 enables the master selection machine 402 and the subordinate reselection machine 410. Thereafter, in a step 706, the Minnow 304 goes into an Idle state.

The Minnow 304 remains in the idle state. This changes in a step 708 when the initiator selects a target at the master bus SCSI ID (or address) as set by the ID switch 406. Thereafter, in a step 710, the master selection machine 402 responds to the selection of the Minnow 304 in accordance with the receipt of the master SCSI ID from the master SCSI bus 104 as set by ID switch 406. In a step 712, the master selection machine 402 handshakes an Identify Message Out received from the initiator on the master SCSI bus 104.

Thereafter, in a step 714, the master selection machine 402 informs the main control machine 412 via master selection machine control signals 414 of the selection, it then retrieves the Logical nit Number from the Identify Message Out, and converts it to the ID info (subordinated bus SCSI ID number) of the target on the subordinate SCSI bus 306. The master selection machine 402 then sends the ID info via line 408 to the subordinate selection machine 410.

Thereafter, in a step 716, the mater control machine 412 enables the subordinate selection machine 410. This is done via subordinate selection machine control signals 420.

Thereafter, in a step 718, the subordinate selection machine 410 selects the target device on the subordinate SCSI bus 306 in accordance with the subordinate bus SCSI ID number received from the master selection machine 402.

In a step 720, the subordinate selection machine 410 handshakes the Identify Message Out with the target. It should be noted, that the Logical Unit Number of the Identify Message Out provided on the subordinate SCSI bus 306 is set to zero. This is always the case. In other words, the Logical Unit Number on the subordinate SCSI bus 306 is always set to zero. No value other than zero can be used for the LUN on the subordinate SCSI bus 306 because there would be no way to use the conventional SCSI protocol on the main SCSI bus 104.

The subordinate selection machine 410, in a step 722, informs the main control machine 412 of the completion of the handshaking after the Identify Message Out with the target.

Thereafter, in a step 724, a main control machine 412 via transceiver control signals 418 causes the transceivers 406 to connect the master SCSI bus 104 with the subordinate SCSI bus 306 so that it appears as if direct communications is taking place between the initiator on the master SCSI bus 104 and the target on the subordinate SCSI bus 306. This communications takes place in accordance with the standard SCSI protocol as long as the initiator and target want it to take place.

Once communications ceases, the main control machine 412 detects the disconnection, as indicated by a step 726. At that point, the Minnow 304 returns to the idle state 706.

Figure 7:
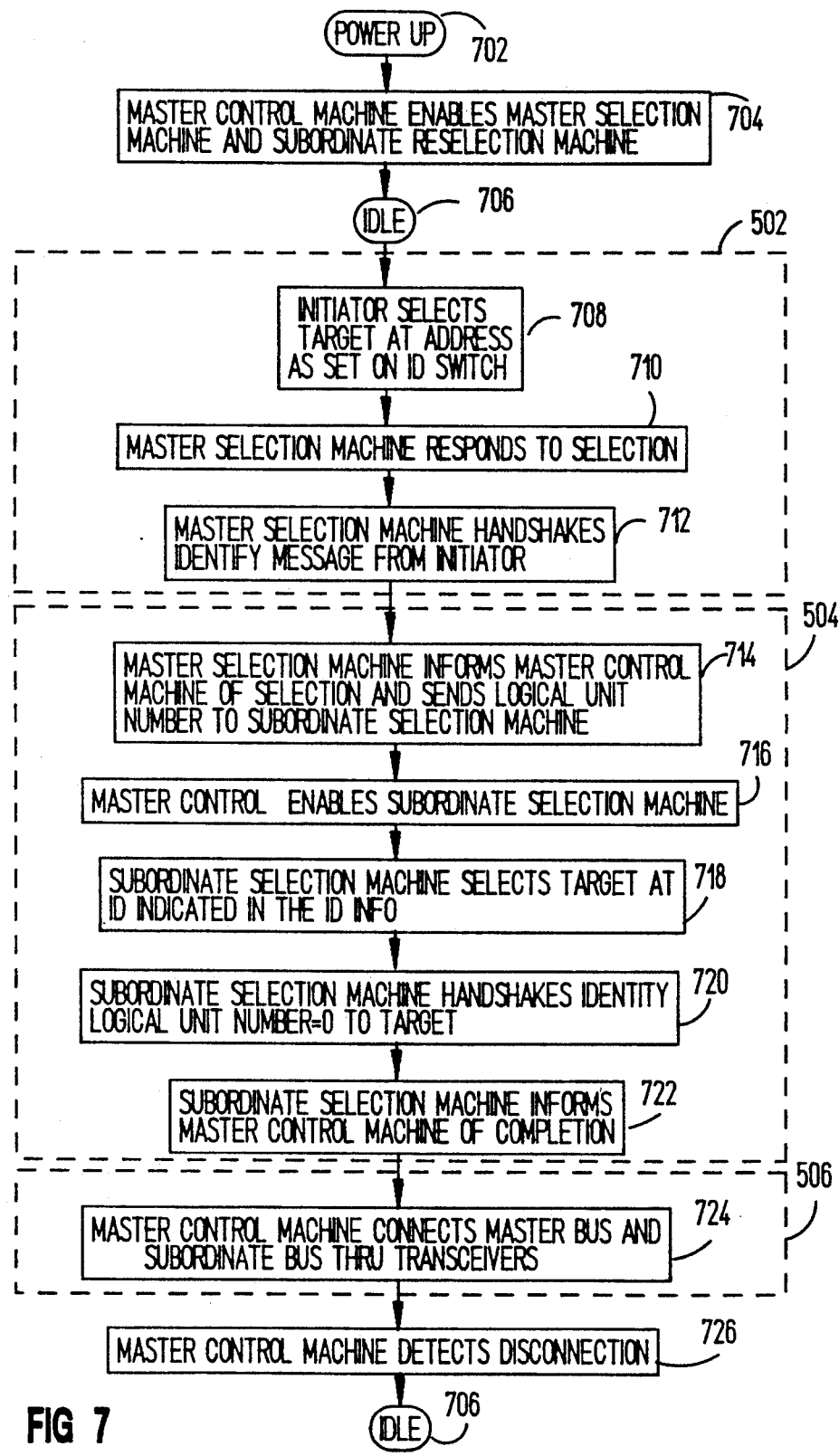
FIG. 7 is a more detailed block diagram of the steps of the Select cycle of the present invention.

It should be noted that the dashed line boxes that appear in FIG. 7 indicate the correspondence between the steps of FIG. 7 and the steps of FIG. 5. This approach allows a greater understanding of the details of the three steps of the selection cycle shown in FIG. 5 as set forth in FIG. 7.

Figure 8:
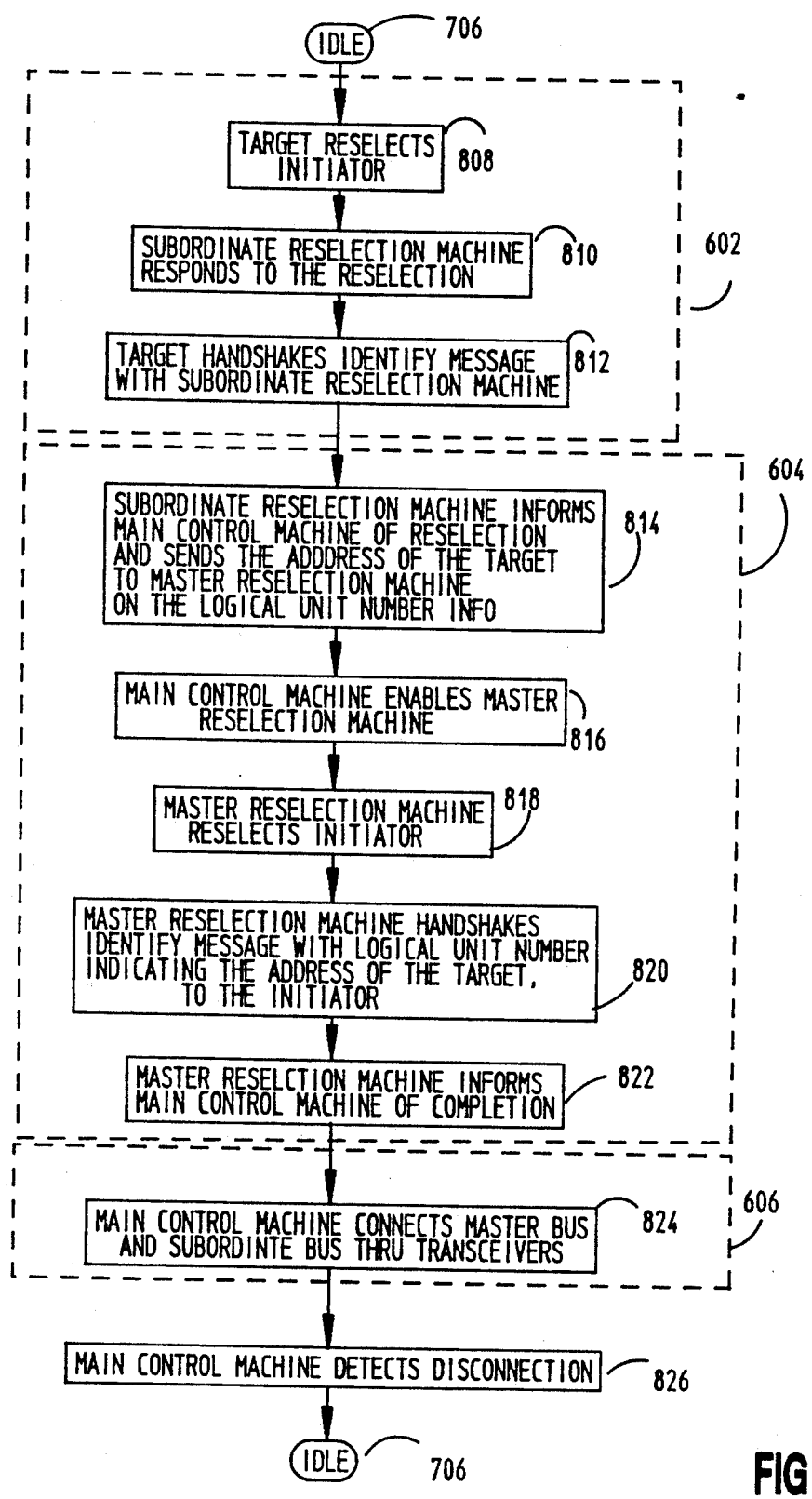
FIG. 8 is a more detailed block diagram of the steps of the Reselect cycle of the present invention.

The Reselection cycle 644 is now described in greater detail with reference to FIG. 8. The Minnow 304 is in the idle state 706 until the target reselects the initiator by sending a subordinate bus SCSI ID number out on the subordinate SCSI bus 306. This is indicated by a step 808.

The subordinate reselection machine 440 responds to the reselection of the target as indicated by the receipt of the subordinate bus SCSI ID number of the subordinate SCSI bus 306 that corresponds to the initiator. This is indicated by a step 810.

Thereafter, the target handshakes the Identify Message In with the subordinate reselection machine 440, as indicated by a step 812. As discussed above with respect to step 720 of FIG. 7 of the Selection cycle, the Logical Unit Number is always specified to be zero for all subordinate bus SCSI ID numbers.

Thereafter, the subordinate reselection machine 440 informs the main control machine 412 of the reselection via subordinate reselection machine control signals 422. It then converts the subordinate bus SCSI ID number to the logical unit info, which is supplied by line 424 to the master reselection machine 404. This is indicated by a step 814.

Thereafter, the master control machine 412 enables the master reselection machine 404, using master reselection machine control signals 416, as indicated by a step 816.

The master reselection machine 404 reselects the initiator by sending out the master bus SCSI ID number on the master SCSI bus 104 which corresponds to that of the initiator. This is indicated by a step 818.

Thereafter, the master reselection machine 404 handshakes the Identify Message In with the logical unit number indicating the address of the target to the initiator on the master SCSI bus 104. This is indicated by a step 820.

The master reselection machine 404 then informs the main control machine 412 of the completion of this handshaking of the Identify Message In, as indicated by a step 822.

The master control machine 412 uses transceiver control signals 418 to cause the transceivers 406 to provide the proper connection between the subordinate SCSI bus 306 and the master SCSI bus 104 so that it appears that there is now direct communications between the target connected tot he subordinate SCSI bus 306 and the initiator connected to the master SCSI bus 104. This is indicated by a step 824. This communication occurs until communications have been completed. After the communications has been completed, a master control machine 412 detects the disconnection, as indicated by a step 826. Thereafter, the Minnow 304 enters the idle state 706.

While various embodiments of the present invention have been described above, it should be understood that they have been presented by way of example, and not limitation. Thus the breadth and scope of the present invention should not be limited to any of the above-described exemplary embodiments, but should be defined only in accordance with the following claims and their equivalents.

I claim:

1. A system for allowing more than eight devices to be effectively connected to a master SCSI bus, the system adapted to enable communications to occur between a host device having a first SCSI port, and a plurality of target devices, each having a SCSI port, the system comprising:
   (a) a master SCSI bus connected to the first SCSI port of the host device, the host device having a first master bus SCSI ID number used to identify the host device on said master SCSI bus;
   (b) a subordinate SCSI bus connected to the SCSI ports of the plurality of target devices; and
   (c) minnow means having a second SCSI port and a third SCSI port, for transferring the communications between the host device and one of the plurality of target devices selected by the host device, said minnow means connected to said master SCSI bus at said second SCSI port and to said subordinate SCSI bus at said third SCSI port, said minnow means having a second master bus SCSI ID number used to identify said minnow means on said master SCSI bus and a first subordinate SCSI ID number used to identify said minnow means on said subordinate SCSI bus, and for converting a SCSI logical unit number received from the host device to a second subordinate bus SCSI ID number, said second subordinate bus SCSI ID number identifying said selected target device on said subordinate SCSI bus to establish communications between the host device and said selected target device.

2. The system of claim 1, wherein said minnow means further comprises:
   (a) master selection machine means, connected to said master SCSI bus at said second SCSI port, for responding to said second master bus SCSI ID number, and for performing said conversion of said SCSI logical unit number to said second subordinate bu SCSI ID number;
   (b) subordinate selection machine means, connected to said subordinate SCSI bus at said third SCSI port and connected to said master selection machine means, for selecting said selected target device based on said second subordinate bus SCSI ID number received from said master selection machine means, and for sending a subordinate bus Identify Message Out signal, including said second subordinate bus SCSI ID number, to said selected target device;
   (c) transceiver means for connecting said master SCSI bus to said subordinate bus; and
   main control machine means, connected to said master selection machine means, to said subordinate selection machine means, and to said transceiver means, for enabling said subordinate selection machine means to establish communications with said selected target device, and for causing said transceiver means to transfer the communications between the host device and said selected target device after said selected target device responds to said subordinate selection machine means.

3. The system of claim 2, wherein said master selection machine means includes;
   an ID switch to permit the setting of said second master bus SCSI ID number of said minnow means; and
   means for receiving a master bus Identify Message Out signal from the host device, and for retrieving said SCSI logical unit number from said master bus Identify Message Out signal.

4. The system of claim 3, wherein said master selection machine means said subordinate selection machine means, transceiver means, and said main control machine means are fabricated on at least one semiconductor chip.

5. The system of claim 1, wherein said minnow means further comprises reselection means for allowing said selected target device to reselect the host device.

6. The system of claim 5, wherein said reselection means comprises:
   (1) subordinate reselection machine means, connected to said subordinate SCSI bus at said third SCSI port, for receiving from said selected target device a subordinate bus Identify Message In signal having said second subordinate bus SCSI ID number, and for converting said second subordinate bus SCSI ID number to said SCSI logical unit number;

(2) master reselection machine means, connected to said master SCSI bus at said second SCSI port and connected to said subordinate reselection machine means, for reselecting the host device and for sending a master bus Identify Message In signal to the host device, said master bus Identify Message In signal containing said SCSI logical unit number received from said subordinate reselection machine means;

(3) transceiver means connected to said subordinate SCSI bus and to said master SCSI bus; and (4) main control machine means, connected to said subordinate reselection machine means, to said master reselection machine means, and to said transceiver means, for causing said transceiver means to transfer the communications between said selected target device and the host device after the host device responds to said master reselection machine means.

7. The system of claim 6, wherein said master reselection machine means comprises an ID switch for permitting the selection of said second master bus SCSI ID number of said minnow means.

8. The system of claim 6, wherein said subordinate reselection machine means, said master reselection machine means, said transceiver means, and said main control machine are all fabricated on at least one semiconductor chip.

9. A system for allowing more than eight devices to be effectively connected to a master SCSI bus, the system adapted to enable communications to occur between a host device having a first SCSI port and a plurality of target devices, each having a SCSI port, the host device connected to the master SCSI bus at the first SCSI, and the plurality of target devices connected to a subordinate SCSI bus, the system transferring communications from the master SCSI bus to a selected target device on the subordinate SCSI bus, the system comprising:

(a) a second SCSI port adapted to be connected to the master SCSI bus;

(b) a third SCSI port adapted to be connected to the subordinate SCSI bus;

(c) transceiver means for connecting said master SCSI bus to the subordinate SCSI bus and transferring the communications received from the host device to the selected target device without changing the logical or physical protocol of the communications;

(d) selection means for responding to a second master bus SCSI ID number received from the host device during a selection cycle and for converting a SCSI logical unit number received from the host device to a second subordinate bus SCSI ID number associated with said selected target device and for selecting the selected target device associated with said second subordinate bus SCSI ID number;

(e) reselection means for responding to a first subordinate bus SCSI ID number received from the selected target device during a reselection cycle for converting said second subordinate bus SCSI ID number to said SCSI logical unit number and for reselecting the host device; and (f) main control machine means, connected to said transceiver means and to said selection means and to said reselection means, for causing said transceiver means to transfer the communications between the host device and the selected target device during said selection cycle and during said reselection cycle.

10. The system of claim 9, wherein said selection means comprises:

(1) master selection machine means, connected to the master SCSI bus, for receiving a master bus Identifying Message Out signal from the host device, and for performing said conversion of said SCSI logical unit number to said second subordinate bus SCSI ID number; and (2) subordinate selection machine means, connected to said master selection machine means and to the subordinate SCSI bus, for selecting said selected target device using said second subordinate bus SCSI ID number and for sending a subordinate bus Identify Message Out signal to be selected target device in accordance with said second subordinate bus SCSI ID number.

11. The system of claim 10, further comprising an ID switch means to permit selection of the second master bus SCSI ID number to which the master selection machine means responds.

12. The system of claim 9, wherein the reselection means comprises:

(1) subordinate reselection machine means, connected to the subordinate SCSI bus, for receiving a subordinate bus Identify Message In signal from the selected target device, and for converting said second subordinate bus SCSI ID number to said SCSI logical unit number; and (2) master reselection machine means, connected to said subordinate reselection machine means and to said master SCSI bus, for sending a master bus Identify Message In signal to the host device, said master bus Identify Message In signal containing said SCSI logical unit number received from said subordinate reselection machine means.

13. The system of claim 12, further comprising an ID switch means to permit the selection of the second master bus SCSI ID number to which the subordinate machine means responds.

14. A method for allowing more than eight units on a master SCSI bus to transfer communications between a host device having a first SCSI port and a selected one of a plurality of target device, each having a SCSI port, the host device connected to the master SCSI bus at the first SCSI port and having a first master bus SCSI ID number used to identify the host device on the master SCSI bus, the system having a minnow device having a second SCSI port and a third SCSI port, the minnow device connected to the master SCSI bus at the second SCSI port and to a subordinate SCSI bus at the third SCSI port, and the plurality of target devices connected to a subordinate SCSI bus, the method comprising:

(1) designating a second master bus SCSI ID number identifying the minnow device on the master SCSI bus;

(2) performing a first select cycle to enable the host device to select the minnow device at said designated second master bus SCSI ID number;

(3) converting a SCSI logical unit number received from the host device on the master SCSI bus to a corresponding first subordinate SCSI ID number associated with the selected target device on the subordinate SCSI bus;

(4) performing a second select cycle to enable the minnow device to select the selected target device at said first subordinate SCSI ID number; and (5) connecting the host device and the selected target device through the minnow device to establish communications between the host device and the selected target device.

15. The method of claim 14, further comprising the steps of:
(1) designating a second subordinate bus SCSI ID number identifying the minnow device on the subordinate SCSI bus;
(2) performing a first reselect cycle to enable the selected target device to select the minnow device at said designated second subordinate bus SCSI ID number;
(3) converting said first subordinate SCSI ID number associated with the selected target device on the subordinate SCSI bus to said SCSI logical unit number;
(4) performing a second reselect cycle to enable the minnow device to select the host device at the first master SCSI ID number; and
(5) connecting the host device and the selected target device through the minnow device to permit communications to take place between the host device and the selected target device.

* * * * *

UNITED STATES PATENT AND TRADEMARK OFFICE
CERTIFICATE OF CORRECTION

PATENT NO. : 5,239,632

DATED : 08/24/93

INVENTOR(S) : Joel Larner

It is certified that error appears in the above-identified patent and that said Letters Patent is hereby corrected as shown below:

Col. 11, 1.54: after "port" delete therefore --,--;

Col. 12, 1. 20: delete "bu" and insert therefore --bus--;

Col. 12, 1. 32: after "subordinate" insert --SCSI--;

Col. 12, 1. 33: before "main" insert --(d)--;

Col. 12, 1. 53: between "means" and "said" insert --,--;

Col. 12, 1. 54: before "transceiver" insert --said--;

UNITED STATES PATENT AND TRADEMARK OFFICE
CERTIFICATE OF CORRECTION

PATENT NO. : 5,239,632
DATED : 08/24/93
INVENTOR(S) : Joel Larner

It is certified that error appears in the above-identified patent and that said Letters Patent is hereby corrected as shown below:

Col. 13, l. 44: delete "said" and insert therefore --the--;

Col. 13, l. 60: between "cycle" and "for" insert --and--;

Col. 14, l. 6-7: delete "identifying" and insert therefore --identify--;

Col. 14, l. 16: delete "be" and insert --the--;

Col. 14, l. 45: delete "device," and insert therefore --devices,--;

Signed and Sealed this

Twenty-second Day of October, 1996

Attest:

BRUCE LEHMAN

*Attesting Officer*    *Commissioner of Patents and Trademarks*